(12) United States Patent
Colombo et al.

(10) Patent No.: US 8,113,803 B2
(45) Date of Patent: Feb. 14, 2012

(54) LUBRICATING SYSTEM FOR AIRCRAFT DRIVE

(75) Inventors: Dario Colombo, Uboldo (IT); Giuseppe Gasparini, Gallarate (IT)

(73) Assignee: Agusta S.p.A., Samarate (IT)

( * ) Notice: Subject to any disclaimer, the term of this patent is extended or adjusted under 35 U.S.C. 154(b) by 456 days.

(21) Appl. No.: 12/360,955

(22) Filed: Jan. 28, 2009

(65) Prior Publication Data

US 2009/0191078 A1    Jul. 30, 2009

(30) Foreign Application Priority Data

Jan. 29, 2008 (EP) .................................. 08425041

(51) Int. Cl.
F01C 1/30 (2006.01)
F03C 2/00 (2006.01)
F03C 4/00 (2006.01)
F04C 2/00 (2006.01)

(52) U.S. Cl. .......... 418/3; 418/9; 418/201.1; 418/206.1; 418/206.8

(58) Field of Classification Search ............ 418/3, 9–10, 418/83, 58, 191, 201.1, 205, 206.1–206.8, 418/209
See application file for complete search history.

(56) References Cited

U.S. PATENT DOCUMENTS

| 2,416,193 | A | 2/1947 | Meyers |
| 2,432,576 | A | 12/1947 | Koffer |
| 4,772,187 | A * | 9/1988 | Thompson ................... 418/191 |
| 5,411,116 | A | 5/1995 | Kish et al. |
| 7,611,340 | B2 * | 11/2009 | Hwang et al. ................ 418/9 |
| 2003/0059325 | A1 * | 3/2003 | Adams ..................... 418/206.1 |
| 2006/0102428 | A1 * | 5/2006 | Anada et al. ................. 184/6 |
| 2006/0257267 | A1 | 11/2006 | Weiss |
| 2008/0304981 | A1 * | 12/2008 | Chuang ..................... 418/205 |

FOREIGN PATENT DOCUMENTS

| DE | 201 07 926 U 1 | 9/2002 |
| EP | 1 657 442 A2 | 5/2006 |
| GB | 282 752 | 5/1928 |
| GB | 1 220 961 | 1/1971 |
| JP | 3-64609 | 3/1991 |
| JP | 5-71475 | 3/1993 |

* cited by examiner

*Primary Examiner* — Theresa Trieu
(74) *Attorney, Agent, or Firm* — Berenato & White, LLC

(57) ABSTRACT

A lubricating pump having a first stage and a second stage; the first stage in turn has an intake connectable hydraulically to a tank of lubricating fluid, and a delivery outlet connectable hydraulically to a lubricated member; the first stage compresses the lubricating fluid from the tank to a pressure for supply to the member; the second stage in turn has an inlet connectable hydraulically to a casing housing the member, and an outlet connectable hydraulically to the tank; the second stage feeds the lubricating fluid in the casing back into the tank; the second stage is a Roots type, and has a first and a second rotor rotating about respective axes to feed the lubricating fluid from the inlet to the outlet; and the first and second rotor are operated by the first stage.

12 Claims, 5 Drawing Sheets

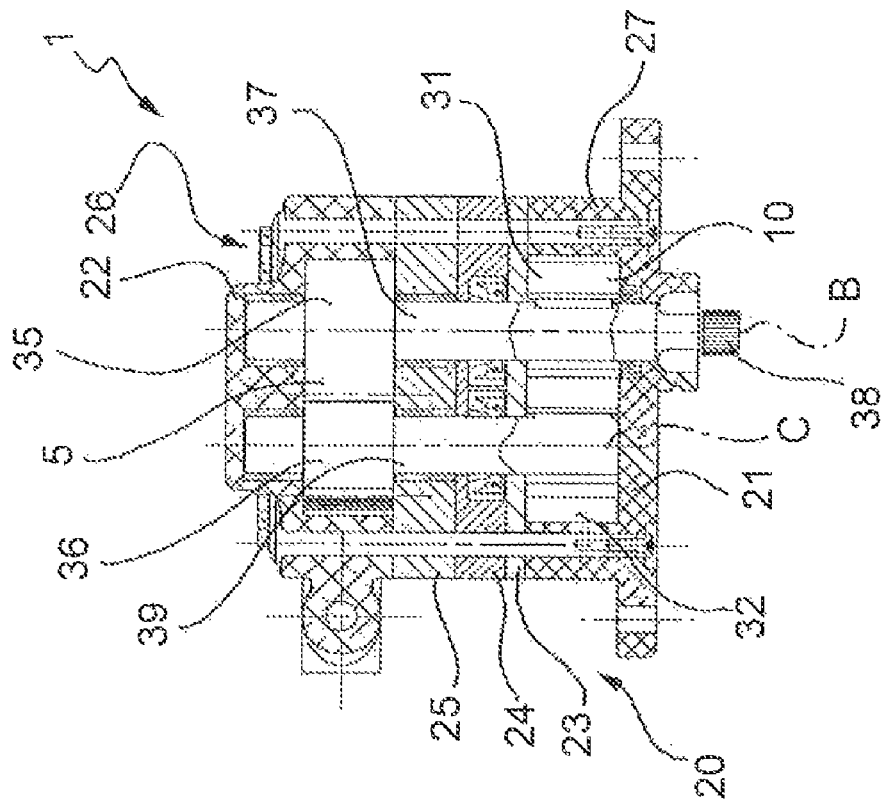
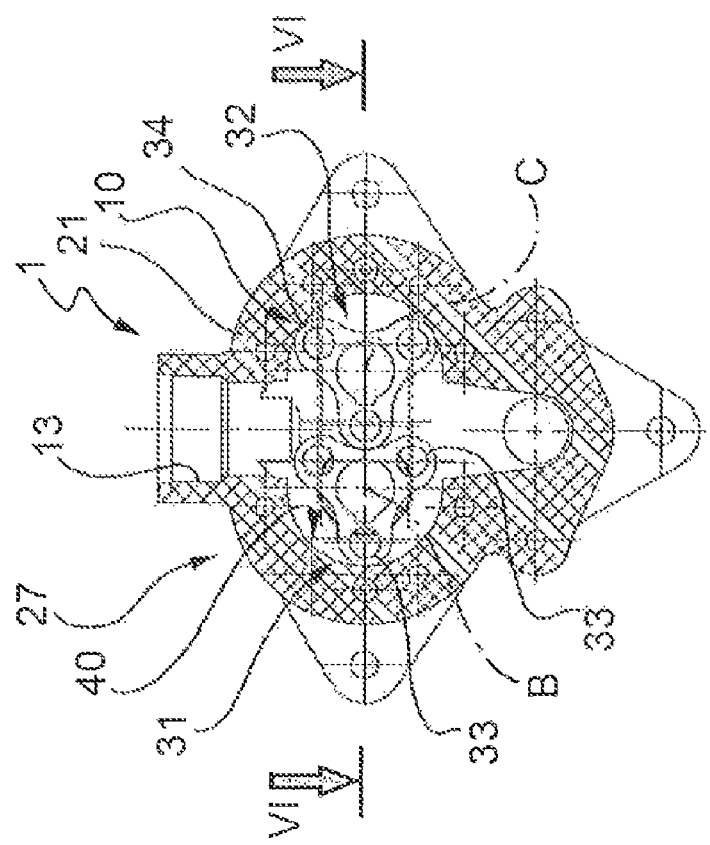

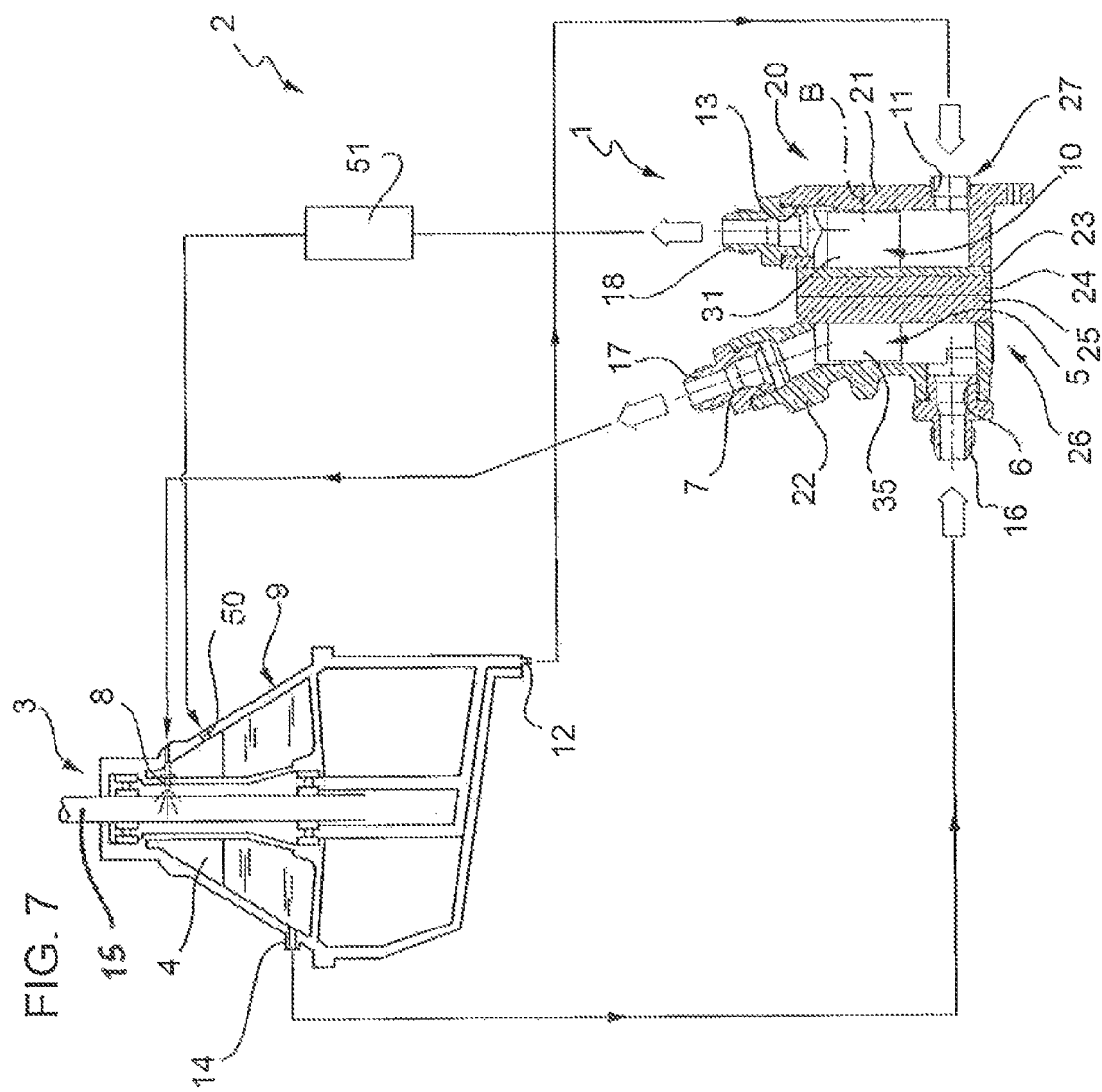

LUBRICATING SYSTEM FOR AIRCRAFT DRIVE

This application is a U.S. Patent Application which claims priority under 35 USC 119 to European Patent Application No. 08425041.4 filed Jan. 29, 2008 and is hereby incorporated by reference in its entirety.

The present invention relates to a lubricating pump, in particular for an aircraft turbine or drive.

BACKGROUND OF THE INVENTION

Lubricating pumps are known which feed a number of jets of pressurized lubricating fluid to a lubricated member, e.g. a drive or turbine, and recover the lubricating fluid from the casing housing the member.

More specifically, lubricating pumps of this sort comprise a first or delivery stage, and a second or recovery stage.

The delivery stage comprises an intake connected hydraulically to a lubricating fluid tank; and a delivery outlet connected hydraulically to a number of nozzles for emitting respective jets of pressurized lubricating fluid onto the lubricated member.

The delivery stage thus ensures the nozzles are fed constantly with pressurized lubricating fluid for supply to the lubricated member.

The recovery stage comprises an inlet connected hydraulically to an opening in the casing of the lubricated member; and an outlet connected hydraulically to the tank.

More specifically, the opening is formed in the base of the casing housing the lubricated member.

After lubricating the member, the lubricating fluid is thus drawn off from the base by the recovery stage and fed back to the tank.

A need is felt to prevent lubricating fluid from accumulating or settling around the opening in the base, and to ensure effective lubrication of the member, while at the same time reducing as far as possible the number of mechanical parts, weight, and size of the lubricating pump itself.

This is particularly so in the case of aircraft applications, in which any reduction in weight reduces the power and fuel requirements of the aircraft.

SUMMARY OF THE INVENTION

It is an object of the present invention to provide a lubricating pump designed to meet the above requirement in a straightforward, low-cost manner.

According to the present invention, there is provided a lubricating pump as claimed in attached Claims.

BRIEF DESCRIPTION OF THE DRAWINGS

A preferred, non-limiting embodiment of the present invention will be described by way of example with reference to the accompanying drawings, in which:

FIG. 5 shows a section along line V-V in FIG. 3;

FIG. 6 shows a section along line VI-VI in FIG. 5;

FIG. 7 shows an operating diagram of a system comprising a drive, a tank, and the FIG. 1-6 lubricating pump.

DETAILED DESCRIPTION OF THE INVENTION

Figure 1:
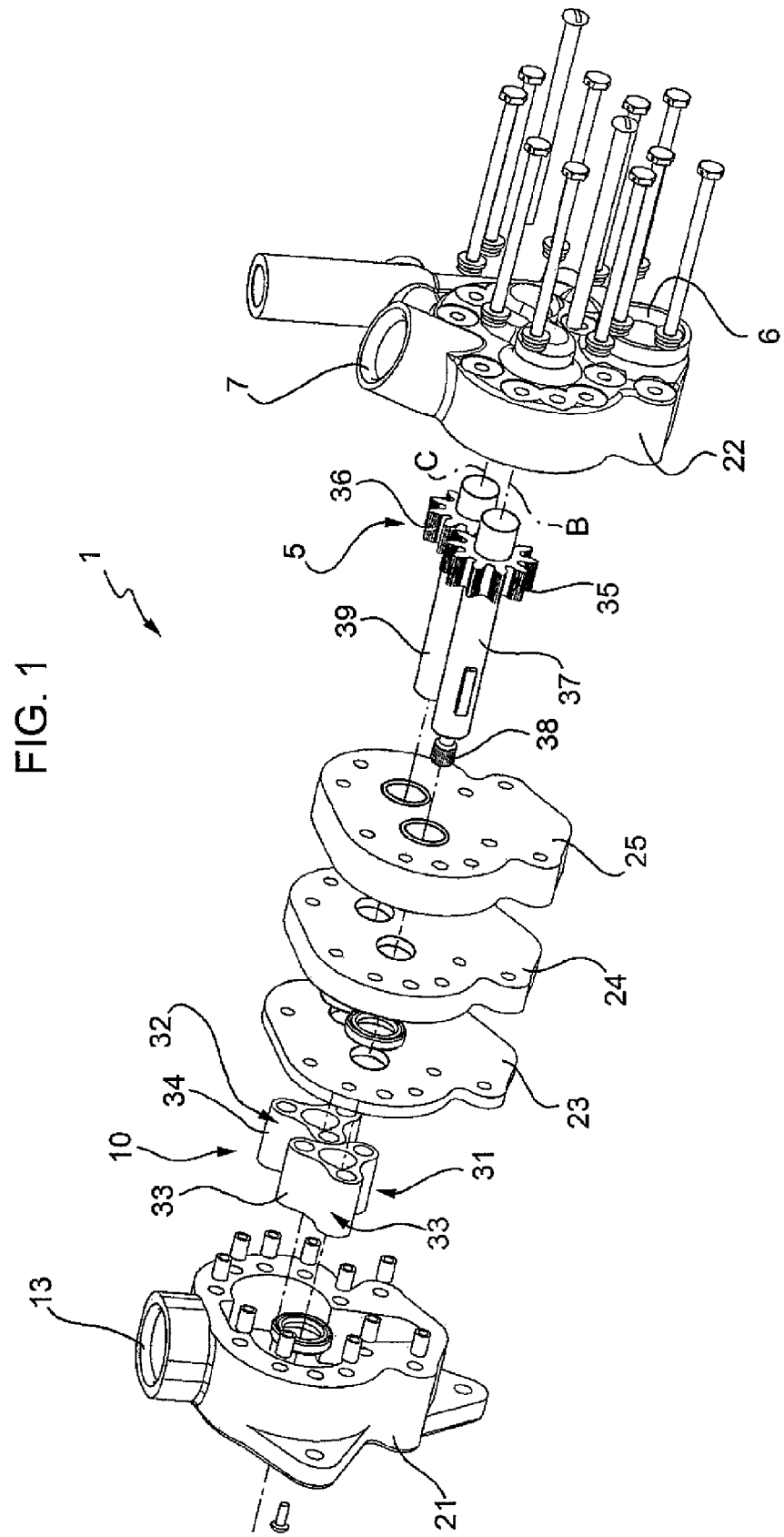
FIG. 1 shows an exploded view in perspective of a lubricating pump in accordance with the present invention.
Figure 2:
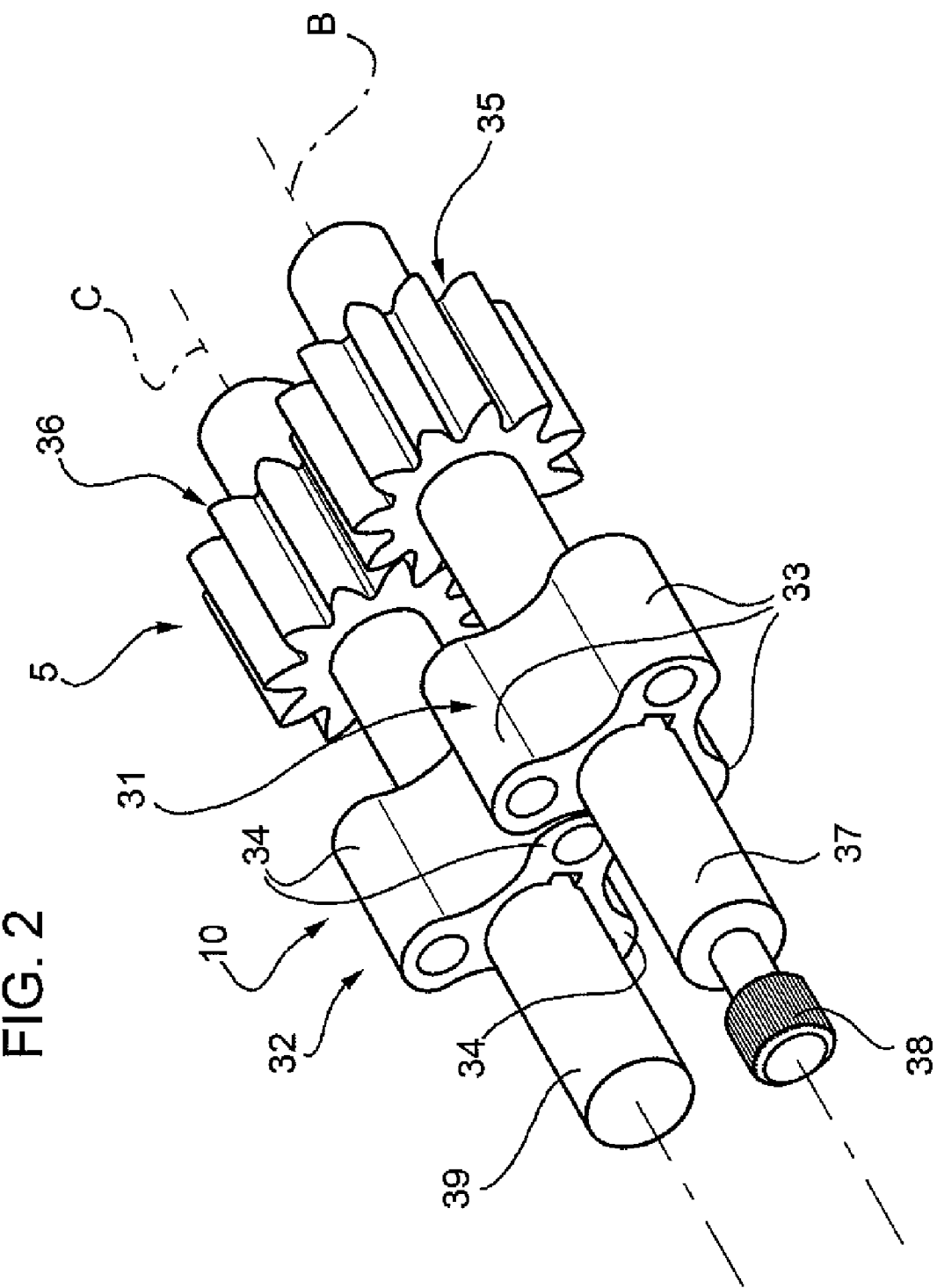
FIG. 2 shows a larger-scale view in perspective of part of the FIG. 1 lubricating pump.
Figure 3:
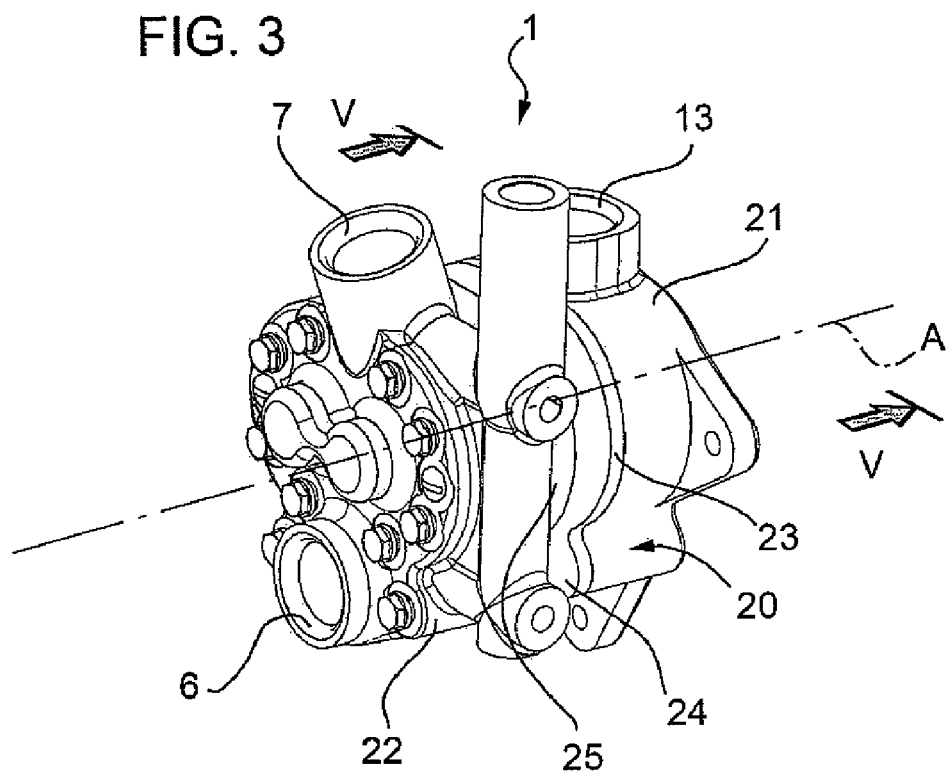
FIGS. 3 and 4 show rear and front views in perspective, respectively, of the FIGS. 1 and 2 pump.
Figure 4:
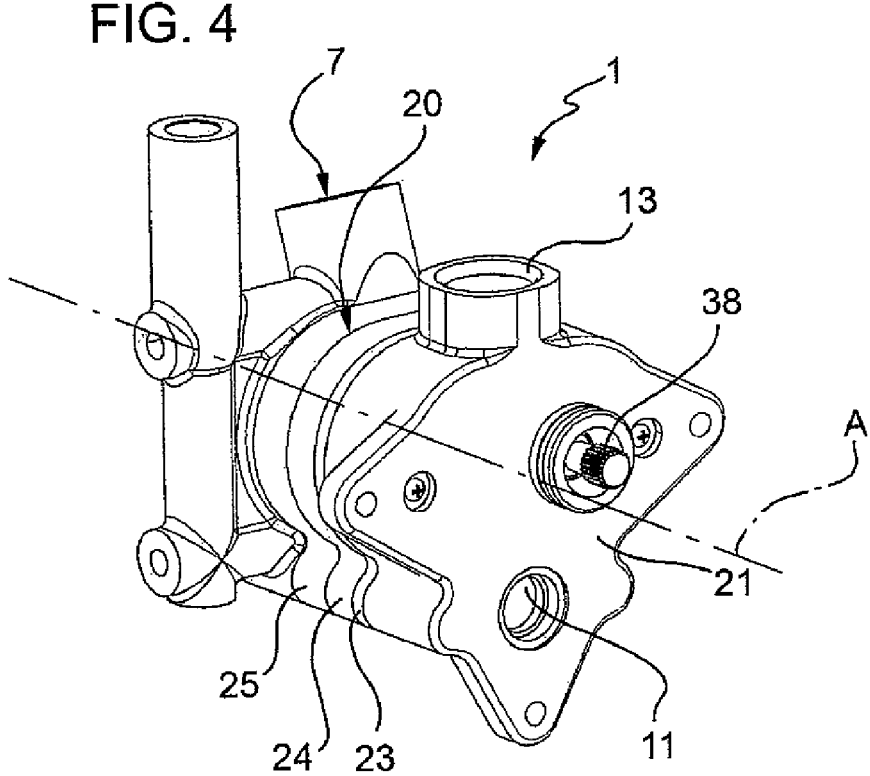

With reference to FIGS. 1 to 7, number 1 indicates a lubricating pump designed for installation in a lubricating system 2 (only shown in FIG. 7) for lubricating a mechanical assembly—in the example shown, a drive 3 for powering a helicopter rotor. In FIG. 7, only a rotor drive shaft 15 of drive 3 is shown.

More specifically, system 2 comprises a tank 4 of lubricating fluid—in the example shown, oil—for lubricating drive 3; and tank 4 is formed inside a casing 9 housing drive 3.

The drive 3 is known, and, in addition to the drive shaft 15, comprises a number of mechanical members not necessary for a clear understanding of the present invention and therefore not shown.

Pump 1 comprises (FIG. 7):
 a delivery stage 5 having an intake 6 connected hydraulically to tank 4, and a delivery outlet 7 connected hydraulically to a number of nozzles 8 (only one shown in FIG. 7) for emitting oil into casing 9 of drive 3; and
 a recovery stage 10 having an inlet 11 connected hydraulically to an opening 12 in an oil sump defined by the base 14 of casing 9, and an outlet 13 connected hydraulically to tank 4.

The delivery stage 5 draws oil from tank 4, compresses it to a predetermined pressure adjustable by means of a known valve not shown, and feeds it to nozzles 8, which in turn feed respective jets of oil onto the drive shaft 15 of the drive 3 to lubricate the drive.

The oil collected in the sump after lubricating drive 3 is recovered by recovery stage 10 and fed back to tank 4, from where it is later drawn off by delivery stage 5 and fed to nozzles 8. More specifically, recovery stage 10 feeds the oil into tank 4 through a number of openings 50 formed in casing 9 and connected hydraulically to outlet 13.

Pump 1 also comprises a housing 20 housing delivery stage 5 and recovery stage 10.

More specifically, housing 20 (FIGS. 3, 4, 6, 7) is elongated along an axis A (only shown in FIGS. 3 and 4), and comprises:
 two end bodies 21, 22 defining respective axial ends of housing 20; and
 three plates 23, 24, 25 interposed axially between the bodies 21, 22, and lying in respective planes perpendicular to the axis A.

With particular reference to FIG. 1, plate 23 is interposed axially between body 21 and plate 24; plate 24 is interposed axially between plates 23 and 25; and plate 25 is interposed axially between plate 24 and body 22.

The housing 20 has a first cavity facing the first plate 23 such that the first end body 21 cooperates with the first plate 23 to define a casing 27 housing the recovery stage 10.

The housing 20 has a second cavity facing the second plate 25, such that the second end body 22 cooperates with the second plate 25 to define a casing 26 housing the delivery stage 5.

Plates 23, 24, 25 separate casings 26, 27 in fluidtight manner by means of lip seals, to prevent the oilflow through delivery stage 5 from mixing with the oilflow through recovery stage 10.

Intake 6 and inlet 11 are both circular, with axes of symmetry parallel to axis A. More specifically, intake 6 and inlet 11 are coaxial, and located on opposite sides of plates 23, 24, 25.

Outlet 13 and delivery outlet 7 are also both circular. More specifically, outlet 13 has an axis of symmetry perpendicular to axis A, and delivery outlet 7 has an axis of symmetry sloping with respect to axis A.

The oilflow from outlet 13 to openings 50 flows through one or more radiators 51, one of which is shown schematically in FIG. 7.

Delivery outlet 7 and outlet 13 are located on the opposite side of axis A to intake 6 and inlet 11.

At intake 6 and delivery outlet 7, delivery stage 5 has respective fittings 16, 17 (FIG. 7) connected hydraulically to tank 4 and nozzles 8 respectively.

Similarly, at outlet 13, recovery stage 10 has a fitting 18 connected hydraulically to tank 4.

Recovery stage 10 is advantageously a Roots type, and comprises two rotors 31, 32 rotating in opposite directions about respective axes B, C, to feed oil from inlet 11 to outlet 13. Both rotors 31, 32 are operated by delivery stage 5.

More specifically, rotors 31, 32 are housed inside the cavity defined by body 21, and each comprise a respective number of—in the example shown, three—lobes 33, 34.

Lobes 33, 34 have conjugate profiles in constant contact with one another, and axes B and C are parallel to each other and to axis A.

Lobes 33, 34 of rotors 31, 32 and casing 27 define a number of chambers 40 (only one shown in FIG. 5) movable about axes B and C. For each complete rotation of rotors 31, 32, each chamber 40 is sequentially:

connected hydraulically to inlet 11 to receive lubricating fluid from opening 12;

cut off from inlet 11 and outlet 13 to feed the lubricating fluid from inlet 11 to outlet 13; and connected hydraulically to outlet 13, as shown in FIG. 5, to feed the lubricating fluid back into tank 4.

When cut off from inlet 11 and outlet 13, chambers 40 decrease gradually in volume to slightly compress the lubricating fluid inside them.

More specifically, on the opposite side to respective axes B and C and facing the inner surface of body 21, lobes 33, 34 have respective cycloid-shaped profiles that interact with the lubricating fluid.

Delivery stage 5 is a volumetric type, i.e. pushes the oil into a chamber decreasing gradually in volume from intake 6 to delivery outlet 7, so as to gradually increase oil pressure from intake 6 to delivery outlet 7.

In the example shown, delivery stage 5 is a gear type, i.e. comprises two gears 35, 36 meshing with each other and rotating in opposite directions about respective axes B, C.

Gears 35, 36 and casing 26 define a number of chambers (not shown) movable about axes B and C, and each of which, for each complete rotation of gears 35, 36, is sequentially connected hydraulically to intake 6 to receive lubricating fluid from tank 4;

cut off from intake 6 and delivery outlet 7; and connected hydraulically to delivery outlet 7 to feed lubricating fluid to nozzles 8.

More specifically, when cut off from intake 6 and delivery outlet 7, the chambers defined by gears 35, 36 decrease gradually in volume to compress the lubricating fluid inside them to the feed value of nozzles 8.

Gear 35 is formed integrally with a shaft 37, of axis B, rotated about axis B by a drive member not shown in detail.

More specifically, shaft 37 extends through plates 23, 24, 25, and has an end 38 projecting from body 21 and outwards of housing 20, and which is rotated by said drive member.

Rotor 31 is also fitted to shaft 37.

Similarly, gear 36 is formed integrally with a shaft 39, which is fitted with rotor 32, is elongated along axis C, and extends through plates 23, 24, 25.

In the example shown, rotors 31, 32 are fitted to respective shafts 37, 39 by respective keys.

Consequently, rotation of shaft 37 about axis B rotates gear 35 about axis B.

Rotation of gear 35 about axis B in turn rotates gear 36 about axis C, and rotor 31 about axis B.

Finally, rotation of gear 36 about axis C in turn rotates rotor 32 about axis C.

Gears 35, 36 thus synchronize rotation of rotors 31, 32, i.e. rotate them about respective axes B and C to feed oil from inlet 11 to outlet 13.

More specifically, gears 35, 36 have straight teeth.

Delivery stage 5 and recovery stage 10 are so sized that, in use, flow through recovery stage 10 is greater than that through delivery stage 5, so as to safeguard, as far as possible and in any operating condition of drive 3, against oil accumulating or settling in the sump of drive 3.

In use, oilflow through recovery stage 10 is preferably at least 1.5 times the oilflow through delivery stage 5.

The head of delivery stage 5 is greater than the head of recovery stage 10.

More specifically, the oil is compressed by delivery stage 5 from 1-bar to 10-bar pressure, whereas compression by recovery stage 10 of the oil flowing from inlet 11 to outlet 13 is negligible.

System 2 comprises known filters and devices (not shown) for ensuring highly aerated oilflow through recovery stage 10, and deaerated oilflow through delivery stage 5.

In actual use, delivery stage 5 draws oil from tank 4, compresses it, and feeds it to nozzles 8, which in turn direct jets of pressurized oil onto drive 3 to lubricate it.

More specifically, free end 38 is rotated by the drive member not shown, and in turn rotates gear 35 and rotor 31 about axis B.

Rotation of gear 35 about axis B in turn rotates gear 36 about axis C.

Rotation of gears 35, 36 compresses the oilflow through intake 6, which is then fed through delivery outlet 7 to nozzles 8.

After lubricating drive 3, the oil accumulates in base 14, and is drawn off through opening 12 by recovery stage 10, which feeds it back to tank 4.

Rotation of gear 35 rotates rotor 31 about axis B by means of shaft 37, and rotation of gear 36 rotates rotor 32 about axis C by means of shaft 39.

Rotation of rotors 31, 32 in opposite directions to each other pushes the inflowing oil from inlet 11 into chambers 40.

Chambers 40 rotate together with rotors 31, 32 to feed the oil in casing 27 to outlet 13.

From where the oil is then fed to tank 4.

The advantages of pump 1 according to the present invention will be clear from the foregoing description.

In particular, the Applicant has observed that, recovery stage 10 being a Roots type capable of handling large amounts of lubricating fluid, pump 1 is particularly effective in preventing lubricating fluid from accumulating and settling inside the sump of casing 9.

Because it does not need two separate motors, one each for recovery stage 10 and delivery stage 5, pump 1 prevents lubricating fluid from accumulating and settling in the sump using very few component parts.

Rotation of rotors 31, 32 about respective axes B and C being synchronized by rotation of gears 35, 36 forming part of delivery stage 5, pump 1 does not need two gears powered by a specific motor of recovery stage 10 and each connected functionally to a respective rotor 31, 32.

As a result, the weight and axial size of pump 1 are less than the total weight and size of known independently operated delivery and recovery stages.

Finally, the cycloid shape of lobes 33, 34, and the fact that rotors 31, 32 are activated by delivery stage 5, greatly reduce stress caused by relative slide of lobes 33, 34, thus reducing the cost and total weight of rotors 31, 32.

Clearly, changes may be made to pump 1 as described and illustrated herein without, however, departing from the protective scope as defined in the accompanying Claims.

In particular, drive 3 may drive a turbine and/or be used in ground applications.

The invention claimed is:

1. A lubricating system (2) for lubricating a drive (3) powering a helicopter rotor, said lubricating system (2) comprising:
    a lubricating pump (1);
    a tank (4) of lubricating fluid; and
    a casing (9) housing a lubricated member of said drive (3);
    said lubricating pump (1) comprising:
        a first stage (5) comprising an intake (6) hydraulically connected to said tank (4) and a delivery outlet (7) hydraulically connected to a number of nozzles (8) for feeding said lubricating fluid into said casing (9) and onto said lubricated member, said first stage (5) compressing, in use, said lubricating fluid from said tank (4) to a pressure to supply to said lubricated member housed within said casing (9); and
        a second stage (10) comprising an inlet (11) hydraulically connected to an opening (12) defined by said casing (9) and an outlet (13) hydraulically connected to said tank (4), said second stage (10) feeding said lubricating fluid in said casing (9) back into said tank (4);
        said second stage (10) being a Roots type comprising a first rotor (31) and a second rotor (32) rotating, in use, in opposite directions to feed said lubricating fluid from said inlet (11) to said outlet (13);
        said first rotor (31) and said second rotor (32) both being operated by said first stage (5);
        said first rotor (31) comprising a number of first lobes (33) and said second rotor (32) comprising a number of second lobes (34) such that said first and second lobes (33, 34) having conjugate profiles in constant contact with one another;
        said first stage (5) comprising a third rotor (35) and fourth rotor (36) connected functionally to said first and second rotors (31, 32), respectively;
        one of said third and fourth rotors (35, 36) being powered and rotating, in use, the other one of said third and fourth rotors (35, 36);
        said lubricating pump (1) further comprising:
        a first shaft (37) fitted with and connecting said first and third rotors (31, 35);
        a second shaft (39) fitted with said second and fourth rotors (32, 36); and
        a housing (20) housing said first and second stages (5, 10);
        said housing (20) comprising:
            a first end body (21) and a second end body (22) defining respective axial ends of said housing (20);
            a first plate (23) and a second plate (25) interposed axially between said first and second end bodies (21, 22) and separating said first and second end bodies (21, 22) in a fluid tight manner;
            said first end body (21) having a first cavity facing said first plate (23) and housing said first and second rotors (31, 32);
            said second end body (22) having a second cavity facing said second plate (25) and housing said third and fourth rotors (35, 36).

2. The lubricating system as claimed in claim 1, wherein said first stage (5) is of a volumetric type pump.

3. The lubricating system as claimed in claim 1 wherein said first and third rotors (31, 35) are angularly integral with said shaft (37).

4. The lubricating system as claimed in claim 1 wherein said third and fourth rotors (35, 36) define respective gears (35, 36) meshing with each other.

5. The lubricating system as claimed in claim 1, wherein a head of said first stage (5) is greater than the head of said second stage (10).

6. The lubricating system as claimed in claim 1, wherein said first and second stages (5, 10) are designed so that, in use, lubricating fluid flow through said second stage (10) is greater than flow through said first stage (5).

7. The lubricating system as claimed in claim 6, wherein t, in use, lubricating fluid flow through said second stage (10) is at least 1.5 times of the flow through said first stage (5).

8. The lubricating system as claimed in claim 1, wherein said shaft (37) extends through said first and second plate (23, 24, 25).

9. The lubricating system as claimed in claim 1, wherein said first stage (5) comprises a first casing (26) defined between said second end body (22) and said second plate (25), and wherein said second stage (10) comprises a second casing (27) defined between said first end body (21) and said first plate (23);
    said first lobes (33) and said second lobes (34) define with said second casing (27) a number of chambers (40) varying cyclically in volume, in use, and inside which said lubricating fluid is fed from said inlet (11) to said outlet (13).

10. The lubricating system as claimed in claim 9, wherein each of said first and second lobes (33, 34) has a cycloid-shaped profile cooperating with said lubricating fluid.

11. The lubricating system as claimed in claim 1, wherein said tank (4) is arranged above said intake (6) of said first stage (5), and wherein said opening (12) is arranged below said tank (4) and above said intake (6).

12. A drive for powering a helicopter rotor in combination with a lubricating system according to claim 1.

* * * * *